(12) United States Patent
Haller

(10) Patent No.: US 7,762,459 B2
(45) Date of Patent: Jul. 27, 2010

(54) INTEGRATION FRAMEWORK

(75) Inventor: Stephan Haller, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 358 days.

(21) Appl. No.: 11/851,186

(22) Filed: Sep. 6, 2007

(65) Prior Publication Data

US 2008/0046463 A1 Feb. 21, 2008

Related U.S. Application Data

(63) Continuation of application No. 10/210,859, filed on Jul. 31, 2002, now Pat. No. 7,290,708.

(51) Int. Cl.
*G06F 19/00* (2006.01)
(52) U.S. Cl. .................. 235/385; 340/572.1
(58) Field of Classification Search .......... 235/385; 340/572.1
See application file for complete search history.

(56) References Cited

U.S. PATENT DOCUMENTS

| | | | |
|---|---|---|---|
| 4,974,166 A | | 11/1990 | Maney et al. |
| 5,166,884 A | | 11/1992 | Maney et al. |
| 5,440,891 A | * | 8/1995 | Hindmon et al. ............ 62/117 |
| 5,469,363 A | | 11/1995 | Saliga |
| 5,936,527 A | | 8/1999 | Isaacman et al. |
| 5,963,134 A | | 10/1999 | Bowers et al. |
| 5,971,592 A | | 10/1999 | Kralj et al. |
| 6,021,443 A | | 2/2000 | Bracho et al. |
| 6,032,127 A | | 2/2000 | Schkolnick et al. |
| 6,148,291 A | | 11/2000 | Radican |
| 6,177,860 B1 | | 1/2001 | Cromer et al. |
| 6,195,006 B1 | | 2/2001 | Bowers et al. |
| 6,259,367 B1 | | 7/2001 | Klein |
| 6,292,894 B1 | | 9/2001 | Chipman et al. |
| 6,301,621 B1 | | 10/2001 | Haverstock et al. |
| 6,321,230 B1 | | 11/2001 | Joslin et al. |

(Continued)

FOREIGN PATENT DOCUMENTS

DE 4341880 6/1995

(Continued)

OTHER PUBLICATIONS

Checkpoint Systems Inc., *Electronic Signatures technologies support supply chain logistics*, Retail News vol. 2, 2001.

(Continued)

*Primary Examiner*—Daniel A Hess
(74) *Attorney, Agent, or Firm*—Fish & Richardson P.C.

(57) ABSTRACT

Methods and apparatus, including computer program products, for real-time data transfer between sensor or actuator devices and higher-level applications.

In one aspect, an integration engine receives a set of rules from an external application and receives item data including item identifiers from one or more tag readers, each item identifier being read from a digital tag bound to a physical item. The integration engine uses the rules and item data to determine in real time which subset of the item data to furnish to the external application.

In another aspect, the integration engine receives from the external application configuration data for controlling an actuator device. The integration engine converts the configuration data to a format compatible with the actuator device; and furnishes the converted configuration data in real time to the actuator device.

20 Claims, 5 Drawing Sheets

U.S. PATENT DOCUMENTS

| | | | |
|---|---|---|---|
| 6,671,698 | B2 | 12/2003 | Pickett et al. |
| 6,684,119 | B2 | 1/2004 | Burnard et al. |
| 2001/0000019 | A1 | 3/2001 | Bowers et al. |
| 2004/0041714 | A1* | 3/2004 | Forster .................. 340/870.17 |

FOREIGN PATENT DOCUMENTS

| | | |
|---|---|---|
| DE | 19623893 | 12/1997 |
| DE | 198 05 465 A1 | 8/1999 |
| DE | 19844631 | 4/2000 |
| DE | 19951060 | 5/2000 |
| DE | 19955120 | 5/2001 |
| DE | 101 26 527 A1 | 12/2002 |
| EP | 0 748 080 A1 | 12/1996 |
| EP | 0908643 | 4/1999 |
| EP | 0913758 A2 | 5/1999 |
| EP | 1174807 A1 | 1/2002 |
| GB | 2308947 | 7/1997 |
| TW | 451145 | 8/2001 |
| TW | 464815 | 11/2001 |
| WO | WO 00/26111 | 5/2000 |
| WO | WO 00/45324 | 8/2000 |
| WO | WO 02/19046 A1 | 3/2002 |
| WO | WO 02/47014 | 6/2002 |

OTHER PUBLICATIONS

Sanjay Sarma, *Auto-ID Center: Lessons Learned*, Auto-ID Center-MIT, Nov. 23, 2001.
Auto-ID Center Website—Technology Section, *Introduction to Auto-ID*, http://www.autoidcenter.org/technology, Jan. 7, 2002.
Sylvia Tiisetso Khabele, *RFID Security, CSC400W: Network and Internetwork Security*, skhabele@cs.uct.ac.za, May 18, 2001.
Kevin R. Sharp, Senior Technical Editor, IDSystems.com, *Planning for RFID Ubiquity*, http://www.idsystems.com/reader/2000_07/plan0700 htm, Jul. 2000.
Raghu das et al., *The Internet of Things*, IDTechEx Ltd., http://www.idtechex.com/book9.html, 2001.
David L. Brock, *The Physical Markup Language*, MIT Auto-ID Center, Feb. 2001.
George Cole, *The little label with an explosion of applications*, Financial Times- FT.com, http://news.ft.com/ft/gx.cgi/ftc?pagename=View&c=Article&cid=FT30414MGWC, Jan. 14, 2002.
EAN International, Uniform Code Council, Inc., *EAN.UCC White Paper on Radio Frequency Identification*, Nov. 1999.
Sanjay Sarma et al., *White Paper- The Networked Physical World*, MIT Auto-ID Center, Oct. 1, 2000.
John Stermer, *Radio Frequency ID: A New Era for Marketers?*, Consumer Insight, Winter 2001.
Mary Ann Falkman editor, *RFID smart labels track chilled foods door to door*, Packeting Digest, Nov. 2000.
Cheryl Rosen, *RFID Chips Put To The Test*, Informationweek.com, http://www.informationweek.com/story/IWK20010628S0008, Jul. 2, 2001.
M-Lab—A Joint Initiative of ETH Zurich and HSG, *The Mobile and Ubiquitous Computing Lab—Project Plan*, www.m-lab.ch, English version 1.02e, St. Gallen/Zurich, Jun. 21, 2001.
Rachel Melcer, *P&G's Vision*, Business Courier, May 18, 2001.
Elgar Fleisch et al., *From computing visions to show cases*, M-Lab, First M-Lab Steering Committee Meeting, Nov. 22-23, 2001, Zurich.
Charles J. Murray, *Motorola cuts bar code replacement effort*, EE Times, Nov. 16, 2001.
Savi Technology Inc. Press Release, *CHEP to deploy Savi Technology's Asset Management Software*, Nov. 6, 2001.
Jay Wrolstad, *American Airlines Deploys Wireless System to Monitor Cargo*, CRNDaily.com, Oct. 12, 2001.
Jay Wrolstad, Wireless tags help grocers deliver fresh food, CRMDaily.com, Oct. 2, 2001.
SAMSys, Inc. press release, *International Paper selects SAMSys Technologies as primary RFID reader supplier*, Jan. 5, 2001.
MIT Auto-Id Center, MIT-AUTOID-WH-001, "The Networked Physical World", MIT Auto-ID Center, Dec. 2000.
David L. Brock, MIT Auto-ID Center, MIT-AUTOID-WH-002, "The Electronic Product Code", Jan. 2001.
Auto-ID Center, Technical Manual, "The Object Name Service", Version 0.5 (Beta), Oat Systems & MIT Auto-ID Center, Feb. 1, 2002.
KnowNow Product Brief: "KnowNow Architecture Overview", 2002.
Segall et al., "Content Based Routing with Elvin4" Jun. 2000.
White Paper, SAP® Consumer Products, From Demand Planning to Vendor Managed Inventory with SAP APO. "DRP and VMI for the Consumer Products Industry", 1999.
Infineon press release, Infineon enters fast growing "smart label" market with my-d, defines new paradigm for cost effective radio frequency identification solutions, Sep. 11, 2001.
Hoffman, Kurt C., "Real-time Location Systems Take Asset Tracking to New Level," http://www.supplychainbrain.com/archives/10.01, Oct. 2001, 5 pgs., XP002259982.
"KnowNow Unveils 'n-way' EAI over the Internet," Searchwebservices, Jun. 28, 2001, 2 pgs., XP002259981.
Margulius, David L., "Dawn of Real-time enterprise," Infoworld, http://www.infoworld.com/article/02/01/17/020121fetca_1.html, Jan. 17, 2002, 2 pgs., XP002259980.
"FedEx and Technology—Maintaining a Competitive Edge," Gale Group Newsletter, Dec. 9, 1996, pp. 1-3, XP002961196.
Wang, You-ning, et al., "A GIS Based Information Integration Framework for Dynamic Vehicle Routing and Scheduling,", *Proceedings of the IEEE International Vehicle Electronics Conference*, Changchun, China, Sep. 6, 1999, pp. 474-479, XP010375965.

\* cited by examiner

INTEGRATION FRAMEWORK

CROSS-REFERENCE TO RELATED APPLICATION

This application is a continuation of U.S. patent application Ser. No. 10/210,859, filed Jul. 31, 2002, which is incorporated by reference in the entirety for all purposes.

BACKGROUND OF THE INVENTION

The present invention relates to data transfer between sensor or actuator devices and higher-level applications.

Automated identification and data collection (AIDC) is the identification or direct collection of data into a computer system without using a keyboard. RFID (radio frequency identification) is an advanced AIDC technology. RFID uses electronic tags that have a small integrated circuit and an antenna. Depending on the type of tag, up to several KB of data can be stored on one tag. The transfer of data takes place at radio frequencies. This makes it possible to read many tags simultaneously, even if the tags are not within a line of sight from a reader. A device used to read data from or write data to electronic tags is generally known as an interrogator.

A "smart item" is an item or machine that can store and communicate data about itself to an external system. Any communication channel (e.g., radio frequencies, infrared) can be used. The communication process can lead to changes in the data stored in the smart item. More sophisticated smart items also have processing capabilities that enable them to interact with other smart items directly and, for example, negotiate a common behavior. Smart items can store and communicate different kinds of data including a unique item identifier (UID) and other item attributes for the item. Some have sensors that can record environmental data such as temperature, humidity, acceleration, or location. The communicated data can be real-time data or historical data, or both.

Examples of smart items include tagged items, RFID interrogators, actuator devices, and aware goods. An actuator device is a machine that moves or controls something (e.g., a conveyer belt, a vending machine). Aware goods are goods that can detect information about their environment (e.g., goods equipped with location or temperature sensors).

SUMMARY OF THE INVENTION

The present invention provides methods and apparatus, including computer program products, for data transfer between sensor or actuator devices and higher-level applications.

A computer program product in accordance with this invention is operable to cause data processing apparatus to receive a set of rules, the rules specifying what data to furnish to an external application; receive item data including item identifiers from one or more tag readers, each item identifier being read from a digital tag bound to a physical item, the item identifier uniquely identifying the item; receive additional item data from other sensor devices, the other sensor devices being devices other than tag readers, the additional item data containing additional physical item attributes besides an item identifier, the additional item data being related to one or more items identified by the tag readers; use the rules, item identifiers, and additional item data to determine which subset of the item identifiers and additional item data to furnish to the external application; and furnish to the external application data consisting of only the subset of the received item identifiers and additional item data.

In general, in one aspect, the computer program product is further operable to receive data from the external application, the data including configuration data for controlling an actuator device; convert the configuration data to a format compatible with the actuator device; and furnish the converted configuration data to the actuator device.

The invention can be implemented to realize one or more of the following advantages:

Applications served by the integration framework receive data from billions of smart items in real time without having to expend a lot of processing power to perform the collection and filtering. Instead, the integration framework can filter out the irrelevant data before furnishing the data to the applications.

The smart items do not need to be confined to a single factory or store. Instead, the integration framework can collect data from many geographically-dispersed locations.

Applications served by the integration framework do not need to support a hardware-specific interface for every possible type of smart item. Instead, the integration framework can hide the hardware-specific details from the applications and convert between hardware-specific formats and a generic format. Hardware can be added or replaced without affecting the applications.

A system built using an integration framework in accordance with the invention is readily extensible. The integration framework provides an open infrastructure that supports different kinds of communication channels for interfacing with applications and different kinds of hardware abstractions for interfacing with different kinds of sensor devices, including different RFID devices. The infrastructure can be easily extended to accommodate new communication channels and new hardware interfaces.

Business rules enable the integration framework to adapt to new configurations and scenarios without the need for a software engineer to reprogram the operations.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

An integration framework in accordance with the invention can be used to implement a wide variety of applications involving AIDC technology. Such applications include supply chain management systems, intelligent agents, and real-time item tracking systems of the kind described in U.S. patent application Ser. No. 60/347,672, filed on Jan. 11, 2002; and No. 60/353,198, filed on Feb. 1, 2002, the entire contents of which are incorporated by this reference. Use in an example ITS will be described below.

Item Tracking System Example

An item tracking system (ITS) includes data processing equipment and software for maintaining information about billions of tagged items. In this specification, the term 'item' has a very broad meaning. It encompasses the meaning of the term 'item' as used in the above referenced patent applications and includes any physical object that might have a location, be shipped, be sold to a consumer, and so on.

A tagged item is an item that carries a self-identifying tag. The tag might be associated with a single item (in the sense above) or it might be associated with a collection of items. Thus, to give just a few examples, a tagged item can be any of the following: an individual item, like a bottle of soap; a case containing a collection of items of possibly various types, or a pallet containing many cases, and so on; a container; a truck or trailer; an airplane; a ship; and a railroad car.

The information maintained by the ITS can include the location, status and context of each tagged item. This information can be both current and historical. The ITS receives queries from higher-level applications and responds to the queries in real time.

The ITS is designed to run continuously, 365 days a year, 24 hours a day, and support a high volume of data traffic. Such a system can benefit from an integration framework in accordance with the invention. As will be described below, the integration framework can collect and filter data on behalf of the ITS and furnish the ITS with only data that has been requested by the ITS.

Figure 1:
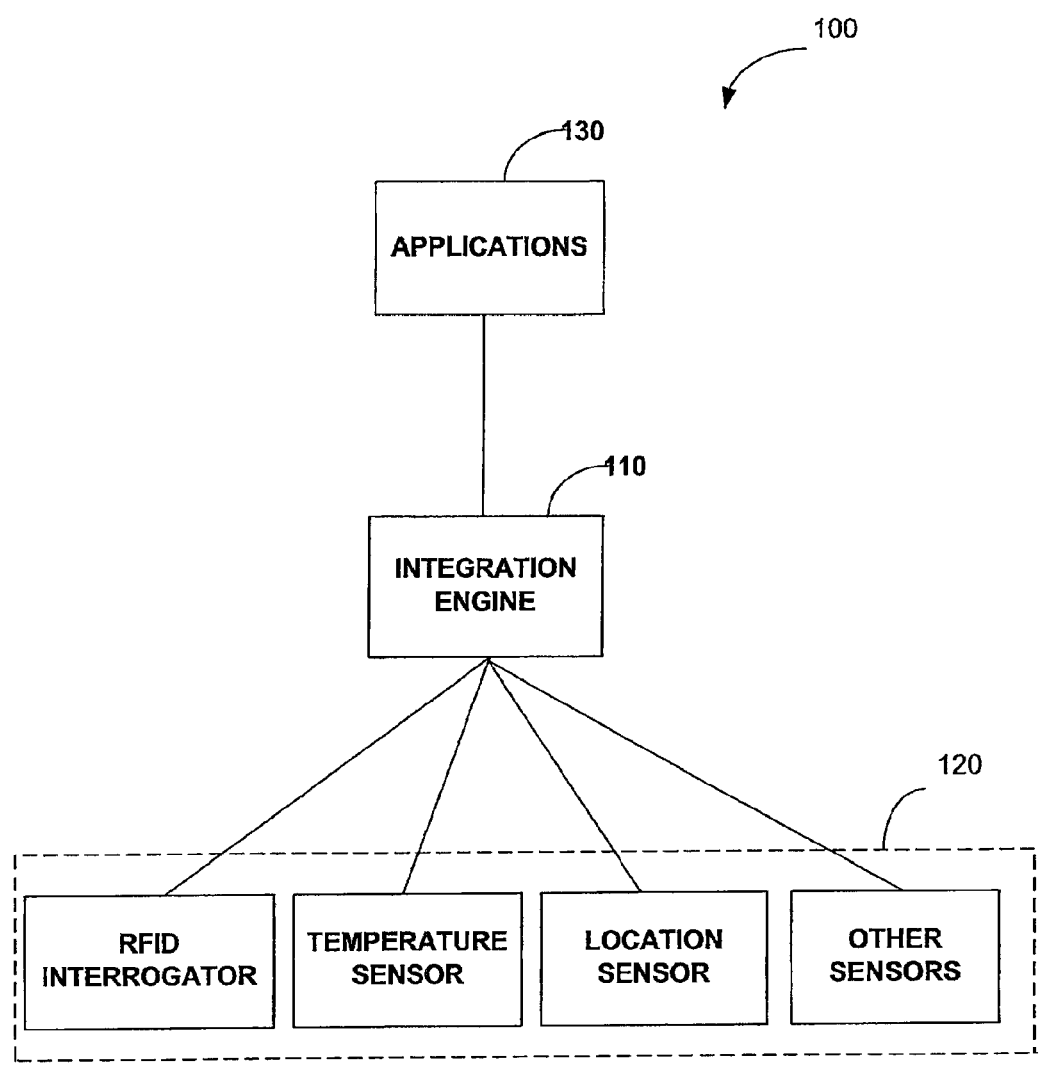
FIG. 1 is a block diagram of an integration framework in accordance with the invention.

FIG. 1 is a block diagram of a framework 100 to integrate RFID technologies with higher-level systems, e.g., the ITS described above. The framework 100 is designed for RFID-enabled devices but can support other sensor or actuator devices like aware goods, embedded Internet appliances and other smart items. Support for a given device is implemented using a hardware interface such as the exemplary hardware interface shown in FIG. 4. The framework 100 collects data from different types of smart items 120 and furnishes the collected data to higher-level applications 130. The framework can also write data to the smart items 120.

The framework 100 has an integration engine 110 that reads and writes data from various smart items 120, processes the data and furnishes the processed data to the higher-level applications 130 in real time. Doing so in real time means that the data is processed as it is received and furnished as it is processed. The integration engine 110 can also receive data from the higher-level applications 130 and write the data to the smart items 120.

Processing the data can include data filtering. For example, one application may only be interested in receiving UIDs and location data while another application may only be interested data collected from certain smart items. A separate filter can be provided for each application requesting data.

Processing the data can also include data aggregation. Data aggregation involves combining data together to produce higher-level data. For example, combining the UID of an item located within a truck with the temperature reading from the truck to produce a temperature reading for the item. Aggregating data can make the data more meaningful than if the data were treated individually. Aggregation can also involve accumulating real-time data into a batch and sending the batched data at pre-defined intervals instead of in real time. The data can be time-stamped with the date and time of collection.

The integration engine 110 is configured to interface with different kinds of hardware interfaces that provide basic read and write functionality. The integration engine 110 translates between hardware-specific data formats and a generic format, or, in some cases, application-specific formats. In this way, the integration engine 110 hides the hardware specifics from the applications 130.

Figure 2:
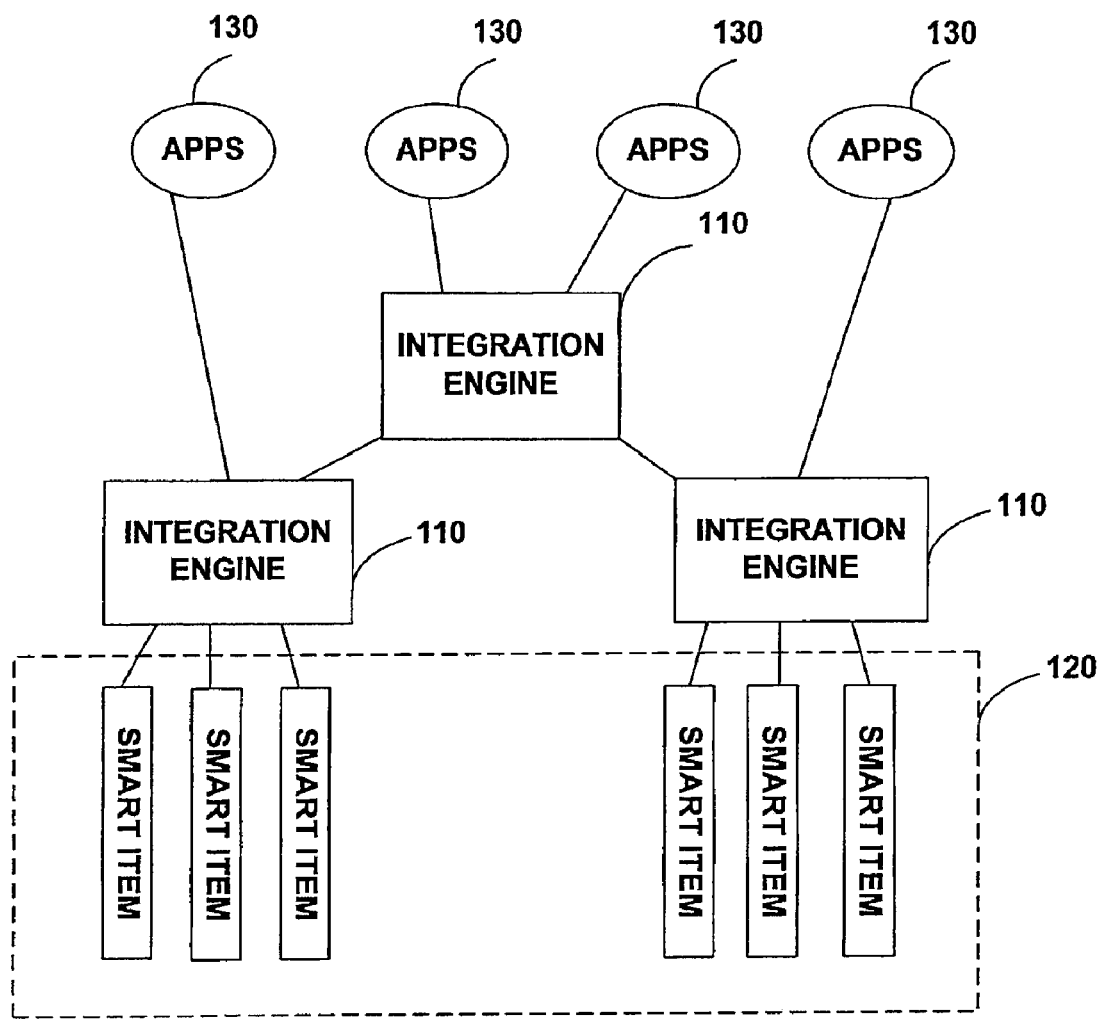
FIG. 2 is a block diagram of an integration framework using multiple integration engines in a hierarchical fashion.

FIG. 2 shows how multiple integration engines 110 can be used to manage a large number of smart items. Each integration engine 110 can be assigned to transfer data to and from particular locations (e.g., factories, loading docks, stores) where smart items are found. The applications 130 can subscribe to one or more of the integration engines 110. Each integration engine 110 can be implemented as multiple integration engines 110 that are nested. The output of one integration engine 110 can be the input into a higher-level integration engine 110.

Figure 3:
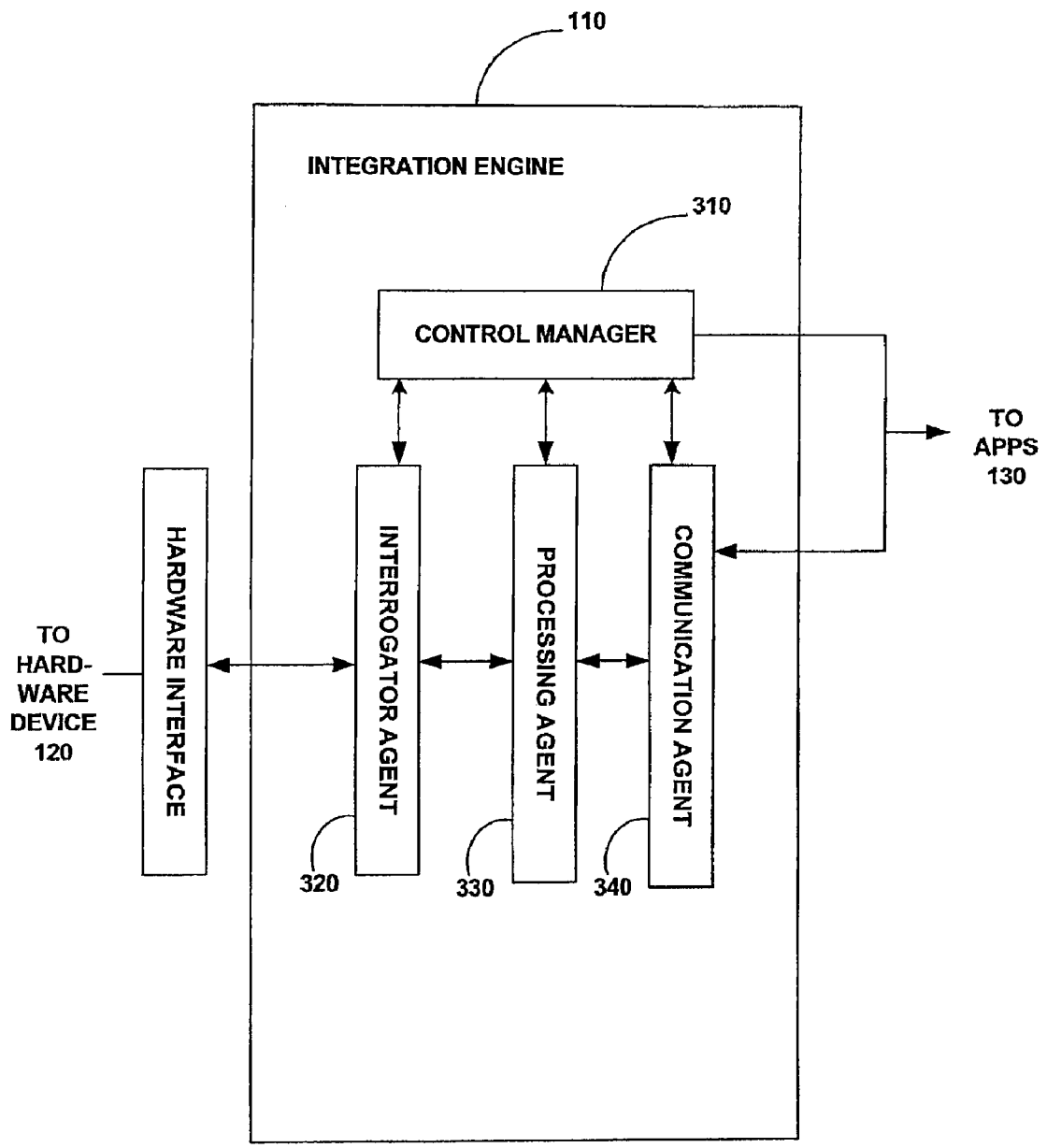
FIG. 3 is a block diagram of an exemplary integration engine.

FIG. 3 shows an exemplary implementation of an integration engine 110. The integration engine 110 manages all resources and objects involved in interacting with smart items and controls the overall process. The integration engine 110 includes a control manager 310, an interrogator agent 320, a processing agent 330, and a communication agent 340. The components can be implemented using conventional programming technologies including component-based technologies such as Java, C# or C++ objects.

The control manager 310 provides the programming interface between the integration engine 110 and the applications 130. The programming interface implements a generic (non-implementation-specific) communication interface to which various adapters can be plugged-in. The adapters translate between a specific communication interface (e.g., RPC, COM, CORBA, JMS, HTTP) and the generic communication interface.

The control manager 310 receives rules from the applications 130, interprets the rules, receives client commands, interprets client commands, and instantiates the appropriate interrogator agents, processing agents, and communication agents to execute the rules. The rules can define or constrain various aspects of the behavior of the interrogator agents, processing agents, and communication agents. For example, the rules can define what data to furnish to an application (e.g., only furnish data if it is UID or location data), what data to write to the hardware (e.g., if the temperature of the truck drops below a pre-determined threshold, then write a command that turns the air conditioning off), or when to furnish the data (e.g., once a day). Rules can also define how to combine collected data to generate higher-level data (e.g., combine the UID of an item located within a truck with the temperature of the truck to determine whether the item is overheated). The control manager 310 interprets and applies the rules as data is received.

In one implementation, the control manager 310 contains or is coupled in some way to a rules repository for storing the rules received from the applications and a rules engine for executing the stored rules. The rules received from the applications can be represented as UML (Unified Modeling Language) models, EJB (enterprise JavaBeans) beans, or XML (Extensible Markup Language) documents. If necessary, the control manager 310 converts the rules into an internal format used by the rules engine.

An interrogator agent 320 is responsible for overall control over a single hardware device interface such as an RFID controller interface. An interrogator agent 320 interfaces with a hardware interface, the control manager 310, and a processing agent 330. The interrogator agent 320 receives data from the hardware interface. The interrogator agent 320 can be configured according to the requirements of the hardware interface. For example, some hardware interfaces require asynchronous polling whereas other interfaces generate events or interrupts. The interrogator agent 320 generally does not perform any processing on the collected data; instead, it simply forwards the data to a processing agent 330 for processing.

A processing agent 330 is responsible for data filtering, aggregation and transformation operations. The processing agent 330 interacts with the control manager 310 and an interrogator agent 320.

To perform data filtering, the processing agent 330 receives sensor data collected by one or more interrogator agents. The processing agent 330 invokes the rules engine to determine whether any of the data satisfies the conditions specified in the rules. Any data that does not meet the conditions is not forwarded. The data that meets the conditions is forwarded to the communication agent 340.

To perform data aggregation, the processing agent 330 stores the received data in a buffer until it has received all the data required by a given rule.

The processing agent 330 receives data in a hardware-specific format. The processing agent 330 uses mapping tables to convert between the hardware-specific format and the generic format that the integration engine 110 outputs to the applications 130.

The data load can be shared among multiple processing agents. Some processing agents 330 may only process data containing a certain kind of information, such as purchase order numbers, for example. In such cases, the interrogator agent 320 determines the kind of information it has collected based on either the type of hardware (e.g., a bar code scanner emits bar code information) or metadata describing the data (e.g., as defined in the logical tag type described in reference to FIG. 4). Some processing agents 330 may process complex data—data that is aggregated from the output of several processing agents 330. The same processing agent or agents 330 can serve applications that request the same kind of data.

A communication agent 340 is responsible for furnishing data to the applications 130 using either a push or pull model. An application can explicitly request a read or write operation be performed on the smart items 120 (pull model), or an application can request to be notified when the integration framework receives data from the smart items 120 (push model).

The communication agent 340 receives processed data from one or more processing agents 330 and furnishes the data to all subscribing applications 130. The communication agent 340 maintains a list of subscribing applications 130 and their respective destination parameters. The communication agent 340 can be a collection of communication agents 340 with each communication agent implementing a specific communication interface or protocol (e.g., RPC, COM, CORBA, JMS or HTTP).

Instead of furnishing the processed data directly to the subscribing applications 130, the communication agent 340 can use an intermediary, e.g., an event router. The event router would appear on the list of subscribing applications. An event router is a service that routes messages (events) between software entities. The messages can be used to notify the message recipient about some occurrence or to send a query to the recipient. Examples of suitable event routers include the KnowNow® event router, available from KnowNow Incorporated of Mountain View, Calif., or the Elvin messaging service available from the Distributed Systems Technology Center of Queensland, Australia.

In one implementation, the communication agent 340 furnishes the data in the format of a data object (or collection of objects) that has methods that the external applications can invoke to retrieve the UID and additional item data. In another implementation, the data format is XML. The advantage of XML is that it is flexible, extensible, self-describing, and widely used for data exchange.

Figure 4:
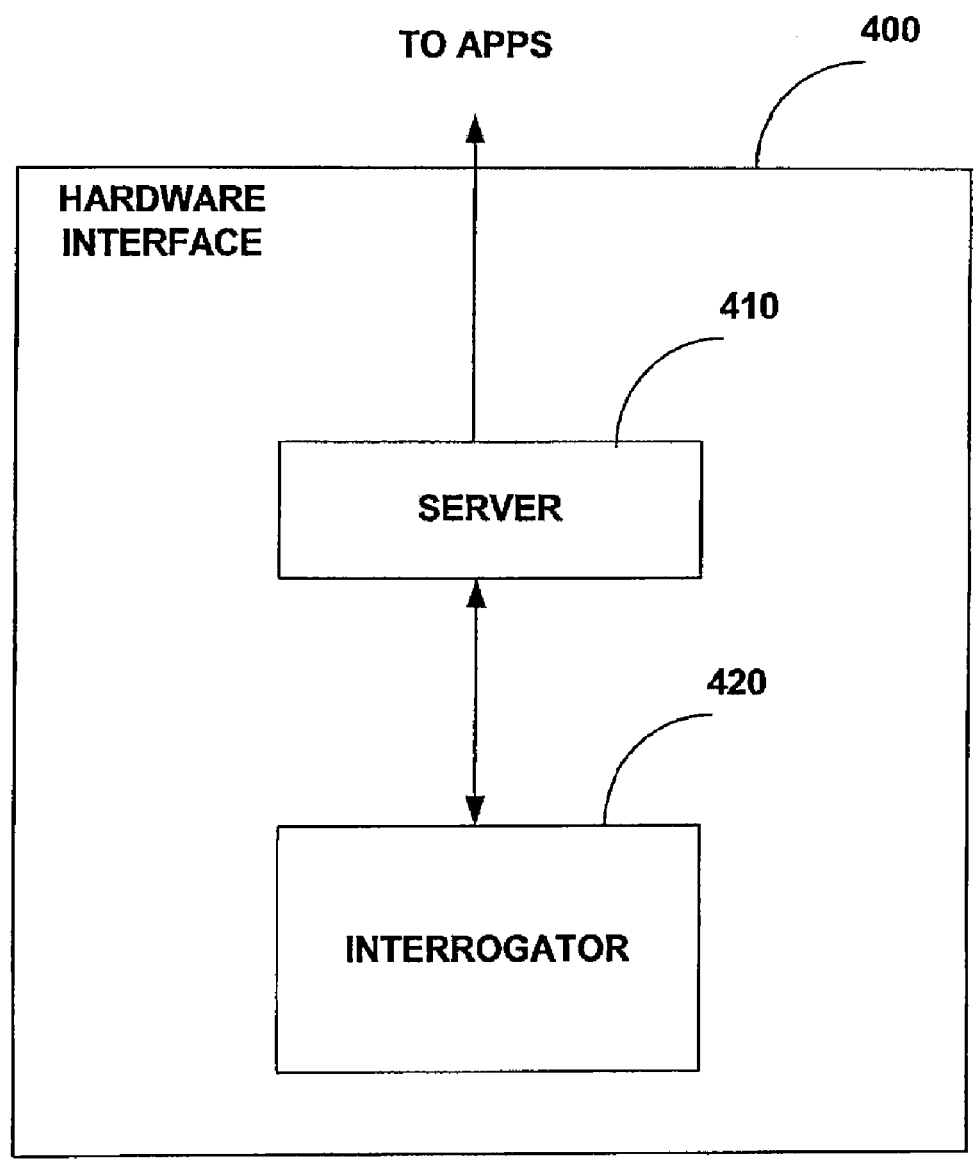
FIG. 4 is a block diagram of an exemplary hardware interface.

FIG. 4 is a block diagram of an exemplary hardware interface 400. The hardware interface 400 is software that enables higher-level software to interact with the underlying hardware. Currently, a wide range of RFID technologies are available from multiple vendors. Depending on the application scenario, a specific type of tag needs to be chosen (active/passive, read-only/rewritable and so on). Advantageously, the hardware interface is implemented using open standards so that it can be used with a variety of RFID technologies from a variety of vendors. The hardware interface can receive requests to read data from, or requests to write data to, the hardware device. The data from the hardware device can be sent to either an interrogator agent 320 or a processing agent 330.

The interface 400 includes an abstraction layer, server 410, that hides the details of the interrogator 420. The server 410 communicates with the interrogator 420 through a hardware-dependent interface. At run time, a specific server 410 instance is responsible for one and only one interrogator 420. However, several applications can communicate with the same server 410 instance simultaneously.

A server 410 supports at least two different kinds of reading requests. A discrete reading request returns information on only the tags that can currently be read. A continuous reading request returns information on all tags that have been read and buffered since the previous reading request was made.

A server 410 can accept data to be written. The data to be written can be data to be stored on a tag or can be control data that controls the behavior of the hardware. For example, a smart conveyer belt can receive control data that switches between a left belt and a right belt; a smart vending machine can receive control data that adjusts the price of an item or adjusts the temperature of the machine.

Additionally, a server 410 makes the following functions available:

Initialize

This function initializes the interface 400 for use. All hardware is initialized, as are necessary communication ports and software objects and processes. This is a generic initialization function. Hardware-specific details can be set in hardware-specific configuration files.

Terminate

This function terminates the use of the interface 400. This is the inverse function to Initialize: All hardware is freed, communication ports are closed and all involved software objects and processes are terminated (unless they are in use by another process). This is a generic termination function. Hardware-specific details can be set in hardware-specific configuration files.

Detect Tags

This function detects whether and how many tags can currently be read.

Define Logical Tag Type

Figure 5:
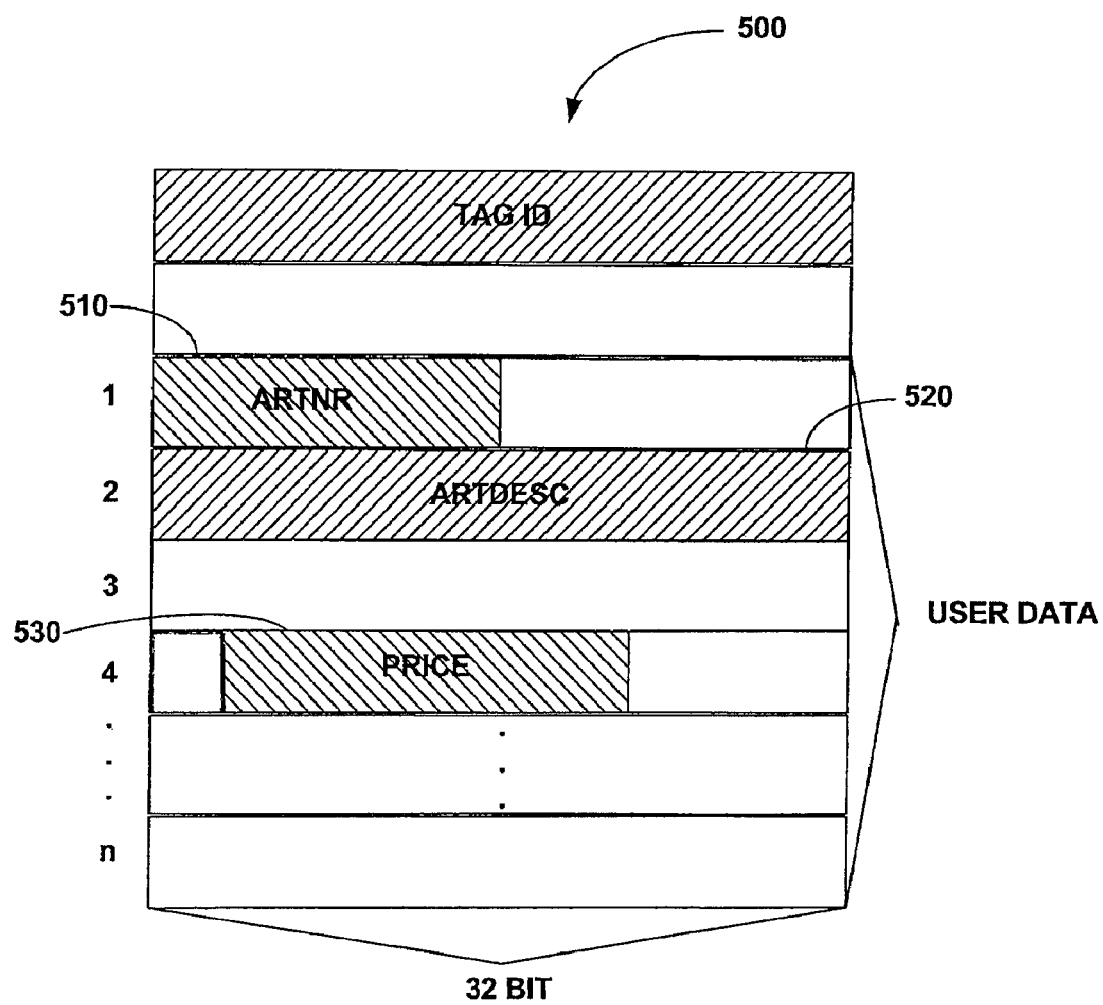
FIG. 5 is a block diagram of an exemplary electronic tag.

This function defines the logical tag type for a given tag. The logical tag type describes the organization of data on the tag. The exemplary electronic tag 500 shown in FIG. 5 illustrates this. As shown, the user data on the tag consists physically of n 32-bit data blocks. Logically however, it has three named data fields: the article number ("ARTNR") 510, a description of the article ("ARTDESC") 520, and its price ("PRICE") 530. As shown, the lengths as well as the starting addresses of the fields are not necessarily the same as the block lengths and starting addresses.

The logical tag type defines the name, starting address and length of each data field, its data type (in order to map the field easily to application data) and a description for each data field. The logical tag type also defines a location for storing a tag identifier. The logical tag type definition can be extended to include other information.

Get Logical Tag Type Description and Field Names

This function gets information about a logical tag type. This will generally be used to obtain the field names as well as the fields' lengths and data types.

Start/Stop Continuous Reading

This function starts or stops the continuous reading mode of operation.

Read Fields from Multiple Tags

This function reads data from specific fields of all tags that can be read at the time the function is performed. A parameter specifies whether a reading mode of discrete or continuous is requested. For continuous mode, the server will buffer the information of all tags read. Each call to the read function in continuous mode clears this buffer. However, a call in discrete mode does not clear the buffer.

Read Fields from a Specific Tag

This function is similar to the previous function. The difference is that only fields from a single tag with a specific tag ID are read. Multiple tags may need to be read in order to identify the tag having the specified tag ID.

Write Fields to Multiple Tags

This function writes the same data to specific fields of all tags that can be written at the time the function is performed. The fields are named and depend on the tag type defined for the tag. The same data is written to all tags. This function can be used for mass writing of tags, e.g., at the end of a production line.

Write Fields to a Specific Tag

This function writes data to specific fields of a specific tag in the field of operation of the tag reader-writer. The fields are named and depend on the current tag type. The tag written to is specified by its UID. Data is only written to the specified fields. All data in tag fields not specified in this operation are left unchanged.

Data fields can also be locked with any of the two writing functions as long as the hardware supports that functionality. A field can be written and locked at the same time, or a previously written field can just be locked without overwriting its data.

Hardware-Specific Calls

Some hardware might offer some functionality beyond the scope of this interface. In order for customers to be able to make use of that functionality, this function provides a mechanism to pass through hardware-specific calls directly from the application.

Error Handling

When a communication error occurs, the hardware device 420 or the server 410 tries to solve the problems by itself first, e.g., by retrying a certain operation a number of times. When that low-level error handling fails, the interface 400 provides information about what went wrong so that the application can take appropriate action.

In addition to a generic error code that defines the type of error, a detailed description of the error is also provided. The interface 400 recognizes at least the following types of error conditions:

(1) Interrogator not responding: Fail to initialize interrogator.

(2) Read errors: n tags detected, but only m were read correctly (m<n). Having no tags in the field is not an error condition.

(3) Write errors: Tag could not be written, either because no tags were in the radio field, or there was some specific writing problem, e.g., locked fields or general failure.

(4) No hardware support. Functions like data locking might not be supported by all hardware.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method comprising:
   storing a set of rules received from an application, a rule of the set of rules, when applied, defining a type of data that is to be transmitted to the application from an engine that receives data from a sensor and that transmits commands to an actuator;
   receiving data at the engine from the sensor;
   applying the rule to the data based on executing the rule at the engine;
   determining that the data corresponds to the type and transmitting the data to the application; and
   transmitting a command from the engine to the actuator based on a response provided by the application.

2. The method of claim 1, wherein applying the first rule to the data further comprises:
   instantiating an interrogator agent that is responsible for control of the sensor;
   instantiating an interrogator agent that is responsible for control of the actuator;
   instantiating a processing agent that is responsible for data filtering, aggregation, and transformation; and
   instantiating a communication agent that furnishes the data to the application.

3. The method of claim 1, further comprising:
   applying another rule of the set of rules to the data,
   wherein applying the other rule to the data further comprises detecting whether sensed temperature data drops below a pre-determined threshold, and
   wherein transmitting a command from the engine to the actuator further comprises writing a command that controls an actuator associated with an air conditioning unit to an off setting.

4. The method of claim 1, wherein the command is transmitted to the actuator in real time to receiving the data at the engine.

5. The method of claim 1, wherein the sensor is a Radio Frequency IDentification (RFID) reader.

6. The method of claim 1, wherein applying the rule to the data further comprises:
   interpreting the data;
   generating higher-level data based on interpreting the data; and
   applying the rule to the higher-level data.

7. The method of claim 1, wherein the rule is formatted as using Unified Modeling Language (UML), Enterprise JavaBeans (EJB), or eXtensible Markup Language (XML).

8. The method of claim 1, further comprising:
   converting the rule into an internally formatted rule,
   wherein applying the rule to the data based on executing the rule at the engine further comprises executing the internally formatted rule.

9. The method of claim 1, wherein transmitting the command from the engine to the actuator further comprises writing data to the actuator.

10. The method of claim 1, further comprising time-stamping the data with a date and time of collection.

11. The method of claim 1, wherein transmitting the command from the engine to the actuator further comprises:
    filtering the data to determine whether any of the data satisfies a condition specified by the rule; and
    forwarding, as the command, the data that satisfies the condition specified by the rule to the actuator.

12. The method of claim 1, wherein transforming the command from the engine to the actuator further comprises:
    storing the data in a buffer until the data required by the rule is received; and
    transmitting, as the command, the stored data when the data required by the rule is received.

13. The method of claim 1, further comprising:
    receiving a request from the application to access the actuator, at the engine; and
    providing the application with access to the actuator based on the received request.

14. The method of claim 1, further comprising:
    receiving a hardware-specific call from the application, at the engine; and
    transmitting the received hardware-specific call to the actuator.

15. The method of claim 1, further comprising:
    receiving an error message at the engine from the actuator based on transmitting the command;
    interpreting the error message at the engine; and
    transmitting the interpreted error message to the application.

16. The method of claim 15, wherein the error message is a failure-to-initialize error message, a read error message, a write error message, or a no-hardware-support error message.

17. The method of claim 1, wherein transmitting the command from the engine to the actuator further comprises transmitting the command to a smart conveyer belt that switches between a left belt and a right belt based on the command or to a smart vending machine that receives the command and adjusts a price of an item or adjusts a temperature of the smart vending machine based on the command.

18. The method of claim 1, wherein the type of data corresponds to at least one of unique item identifier (UID) data and item location data.

19. An integration engine device comprising:
    a rules repository module that stores a set of rules received from an application, a rule of the set of rules, when applied, defining a type of data that is to be transmitted to the application from an engine that receives data from a sensor and that transmits commands to an actuator;
    an interrogator agent module that receives data at the engine from the sensor;
    a processing agent module that applies the rule to the data based on executing the rule at the engine to determine that the data corresponds to the type and to transmit the data to the application; and
    a control manager module that transmits a command from the engine to the actuator based on a response provided by the application.

20. A computer program product, tangibly embodied in a machine-readable medium, the computer program product including instructions that, when read by a machine, operate to cause a computer program product to:
    store a set of rules received from an application, a rule of the set of rules, when applied, defining a type of data that is to be transmitted to the application from an engine that receives data from a sensor and that transmits commands to an actuator;
    receive data at the engine from the sensor;
    apply the rule to the data based on executing the rule at the engine;
    determine that the data corresponds to the type and transmitting the data to the application; and
    transmit a command from the engine to the actuator based on a response provided by the application.

* * * * *